US007966410B2

(12) United States Patent
Tran et al.

(10) Patent No.: US 7,966,410 B2
(45) Date of Patent: Jun. 21, 2011

(54) COORDINATING DATA DELIVERY USING TIME SUGGESTIONS

(75) Inventors: Anh P. Tran, Seattle, WA (US); Kevin Daniel Resnick, Redmond, WA (US); Susan Annette Loh, Atlanta, GA (US); Mark Sievert Larsen, Redmond, WA (US); Albert Liu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 320 days.

(21) Appl. No.: 12/237,797

(22) Filed: Sep. 25, 2008

(65) Prior Publication Data

US 2010/0077083 A1    Mar. 25, 2010

(51) Int. Cl.
*G06F 15/16* (2006.01)
(52) U.S. Cl. ......... 709/228; 709/203; 709/225; 709/232
(58) Field of Classification Search .................. 709/203, 709/223, 227–228, 230, 225, 232; 370/329, 370/346
See application file for complete search history.

(56) References Cited

U.S. PATENT DOCUMENTS

| | | | |
|---|---|---|---|
| 5,867,657 A | 2/1999 | Bolosky et al. | |
| 7,130,313 B2 | 10/2006 | Pekonen | |
| 7,142,855 B2 * | 11/2006 | Bahl et al. | 370/338 |
| 7,155,487 B2 | 12/2006 | Yau et al. | |
| 7,260,072 B2 | 8/2007 | Lee et al. | |
| 7,286,845 B2 * | 10/2007 | Boariu et al. | 375/349 |
| 7,299,304 B2 | 11/2007 | Saint-Hilaire et al. | |
| 7,305,475 B2 | 12/2007 | Tock | |
| 7,324,474 B2 | 1/2008 | Shirota et al. | |
| 7,337,337 B2 * | 2/2008 | Hong | 713/320 |
| 7,401,147 B2 | 7/2008 | Sikora et al. | |
| 2002/0120696 A1 | 8/2002 | Mousseau et al. | |
| 2003/0105809 A1 * | 6/2003 | Yoshii et al. | 709/203 |
| 2004/0103411 A1 | 5/2004 | Thayer | |
| 2004/0224694 A1 | 11/2004 | Zhao et al. | |
| 2004/0225525 A1 | 11/2004 | Weitzman | |
| 2005/0043020 A1 | 2/2005 | Lipsanen et al. | |
| 2005/0071419 A1 | 3/2005 | Lewontin | |
| 2005/0108322 A1 | 5/2005 | Kline et al. | |
| 2006/0013235 A1 | 1/2006 | Farnham | |
| 2006/0248197 A1 | 11/2006 | Evans et al. | |
| 2007/0011292 A1 | 1/2007 | Fritsch et al. | |

(Continued)

FOREIGN PATENT DOCUMENTS

EP    1715656 A1    10/2006

(Continued)

OTHER PUBLICATIONS

Cha, Bonnie, "Palm Announces Low-Cost Treo 680", Dated: Oct. 12, 2006, http://reviews.cnet.com/4532-10921_7-0.html?author=5116399.

(Continued)

*Primary Examiner* — Ramy M Osman

(57) ABSTRACT

Coordinating delivery of data to a first computing device from a plurality of second computing devices based on known power times for a resource associated with the first computing device. One of the second computing devices requests a time interval for data delivery. The first computing device compares the requested time interval to the known power times to determine a delivery time. For example, the requested time interval is compared against activation times for recurrent schedules that use the resource, and against previously determined delivery times. The second computing device delivers data at the determined delivery time to preserve the resource. In some embodiments, the delivery time is adjusted for processing delays and network latency.

20 Claims, 6 Drawing Sheets

U.S. PATENT DOCUMENTS

| | | | |
|---|---|---|---|
| 2007/0058605 A1* | 3/2007 | Meylan et al. | 370/346 |
| 2007/0074217 A1 | 3/2007 | Rakvic et al. | |
| 2007/0149186 A1 | 6/2007 | Barbosa da Torre et al. | |
| 2007/0177558 A1 | 8/2007 | Ayachitula et al. | |
| 2008/0025378 A1 | 1/2008 | Mahany et al. | |
| 2008/0113656 A1 | 5/2008 | Lee et al. | |
| 2008/0120409 A1 | 5/2008 | Sun et al. | |
| 2008/0126751 A1 | 5/2008 | Mizrachi et al. | |
| 2008/0130541 A1* | 6/2008 | Kokku et al. | 370/311 |
| 2009/0182608 A1 | 7/2009 | Tran et al. | |
| 2009/0182802 A1 | 7/2009 | Tran et al. | |
| 2009/0183157 A1 | 7/2009 | Tran et al. | |
| 2009/0307519 A1* | 12/2009 | Hyatt | 713/502 |
| 2009/0327390 A1 | 12/2009 | Tran et al. | |
| 2009/0327491 A1* | 12/2009 | Tran et al. | 709/225 |
| 2010/0195584 A1* | 8/2010 | Wilhelmsson et al. | 370/329 |

FOREIGN PATENT DOCUMENTS

| | | |
|---|---|---|
| WO | 2007007330 A2 | 1/2007 |

OTHER PUBLICATIONS

"Symbian S60 Manual", RoadSync Using Exchange ActiveSync, DataViz, Inc, Retrieved on Jul. 29, 2008, pp. 1-33.

"Battle of the Pushers: The Search for the Ideal Push Email Solution", Published by Rafe Blandford, Date: Sep. 10th 2007, 13 pages.

International Search Report and Written Opinion of International Application No. PCT/US2009/058166, dated Apr. 23, 2010, 10 pages.

Yin, et al., "Power-Aware Prefetch in Mobile Environments", Retrieved at << http://ieeexplore.ieee.org/stamp/stamp.-1jsp?arnumber=01022307 >>, "Proceedings of the 22 nd International Conference on Distributed Computing Systems 0 (ICDCS'02)", IEEE, Vienna, Austria, Jul. 2-5, 2002, pp. 8.

Cao, et al., "Cache-Miss-Initiated Prefetch in Mobile Environments", Retrieved at <<http://mcn.cse.psu.edu/paper/song/communication05.pdf>> "Proceedings of the 2004 IEEE International Conference on Mobile Data E.-I Management (MDM'04)", IEEE, Berkeley, California, Jan. 19-22, 2004, pp. 12.

Tuah, et al., "Resource-Aware Speculative Prefetching in Wireless Networks", Retrieved at <<http://portal.acm.org/citation.cfm?id=602413.602418 >>, Wireless Networks 9, 2003, pp. 61-72.

Non-final Office action mailed from the USPTO in U.S. Appl. No. 12/147,846, U.S., Mar. 9, 2010, pp. 10.

Final Office action mailed from the USPTO in U.S. Appl. No. 12/147,846, U.S., Sep. 1, 2010, pp. 13.

Kravets, et al., "Application Driven Power Management for Mobile Communication", Retrieved at << www-sal.cs.uiuc.edu/~rhk/pubs/winet98.ps >>, Wireless Networks, vol. 06, No. 4, Jul. 2000, pp. 1-20.

Pal, at el., "Improving Delivery Time Guarantees for Wireless Data Services", Retrieved at << http://ieeexplore.ieee.org/iel5/9178/29117/01311488.pdf?arnumber=1311488 >>, IEEE Wireless Communications and Networking Conference, WCNC, Mar. 21-25, 2004, pp. 2539-2544.

Zaharia, at el., "Fast and Optimal Scheduling over Multiple Network Interfaces", Retrieved at << http://www.acm.org/src/Matei/matei.html >>, 2007, pp. 16.

Pering, at el., "CoolSpots: Reducing the Power Consumption of Wireless Mobile Devices with Multiple Radio Interfaces", Retrieved at << https://www.usenix.org/events/mobisys06/full_papers/p220-pering.pdf >>, The 4th International Conference on Mobile Systems, Applications and Services, Jun. 19-22, 2006, pp. 220-232.

Flinn, Jason., "Managing Battery Lifetime with Energy-Aware Adaptation", Retrieved at << http://www.cs.cmu.edu/~satya/docdir/p137-flinn.pdf >>, ACM Transactions on Computer Systems, vol. 22, No. 2, May 2004, pp. 137-179.

Pering, at el., "Exploiting Radio Hierarchies for Power-Efficient Wireless Device Discovery and Connection Setup", Retrieved at << http://ieeexplore.ieee.org/iel5/9501/30140/01383368.pdf?tp=&isnumber=&arnumber=1383368 >>, 18th International Conference on VLSI Design held jointly with 4th International Conference on Embedded Systems Design (VLSID'05), India, Jan. 2007, pp. 6.

Non-final Office action mailed from the USPTO in U.S. Appl. No. 12/147,774, U.S., May 14, 2010, pp. 11.

Final Office action mailed from the USPTO in U.S. Appl. No. 12/147,744, U.S., Oct. 15, 2010, pp. 23.

"ViaXML—Open XML Tools from Odyssey Software—Delivers Universal Secure Data Access, Mobile Device Management, Server Push with Action, Peer to Peer, and Notification", 2000, 2 pages.

Valavanis, et al, "MobiShare: Sharing Context-Dependent Data & Services from Mobile Sources", 2003, 8 pages.

Armstrong, et al, "Efficient and Transparent Dynamic Content Updates for Mobile Clients", 2006, p. 56-68.

* cited by examiner

COORDINATING DATA DELIVERY USING TIME SUGGESTIONS

BACKGROUND

Mobile computing devices, such as mobile phones and personal digital assistants (PDA), have become increasingly popular in recent years. As the devices continue to get smaller, there are increasing limitations in resources such as memory, storage, bandwidth, and battery power. Additionally, more applications now consume increasing levels of such resources. For example, many applications execute recurring tasks such as synchronization with a server requiring frequent radio usage. After the radio on the mobile computing device powers on to send data, the radio takes several seconds to power off (e.g., about 3 seconds on 2.5G networks and about 20 seconds on 3G networks). This radio "tail" absorbs power and diminishes battery life on the mobile computing device. Further, there are other power inefficiencies in spinning up the radio and shutting down the radio.

Connected applications with real-time data push or updates are being widely adopted by mobile users. The applications include electronic mail, personal information management, presence information, and other web applications. The servers push the data in an uncoordinated manner such that battery life on the mobile computing device degrades, negatively affecting the user experience.

SUMMARY

Embodiments of the invention coordinate delivery of data to at least one first computing device from a plurality of second computing devices. One of the second computing devices requests a time interval for data delivery. The first computing device compares the requested time interval to a plurality of known power times for a communication resource associated with the first computing device. A delivery time is determined and provided to the second computing device. Coordinating the data delivery preserves the communication resource on the first computing device. In some embodiments, the determined delivery time is adjusted for processing delays and network latency.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
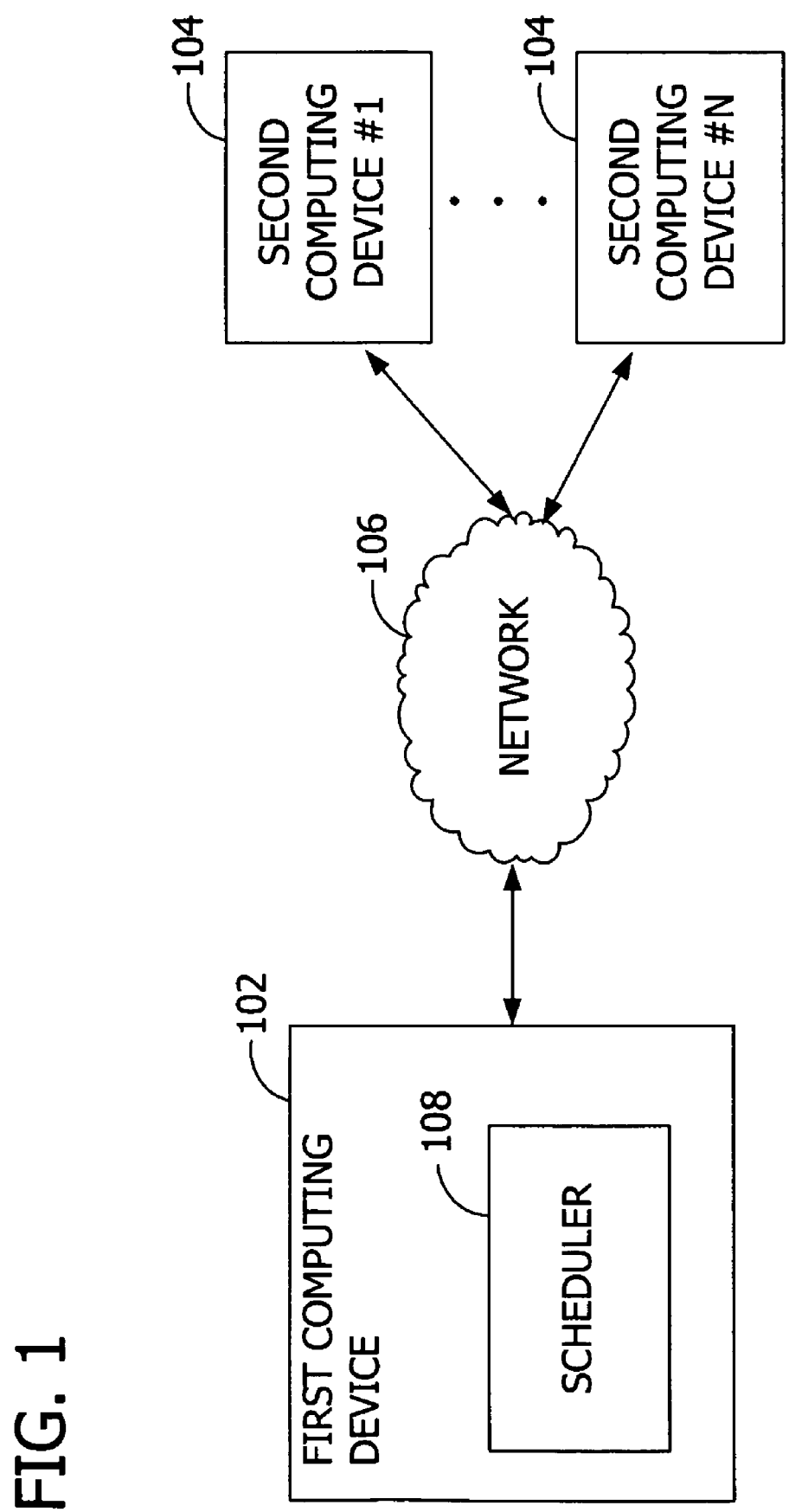
FIG. 1 is an exemplary block diagram illustrating a first computing device receiving data from a plurality of second computing devices.

Referring to the figures, embodiments of the invention coordinate the delivery of data to at least one first computing device 102 from a plurality of second computing devices 104 to reduce consumption of a communication resource on the first computing device 102. In some embodiments, the first computing device 102 provides a hint, suggestion, recommendation, or assignment of a delivery time (e.g., optimal delivery time) to the second computing devices 104 such that a plurality of the second computing devices 104 send the data to the first computing device 102 at or around the same time. In an example in which the first computing device 102 is a mobile computing device 602, the coordinated delivery of data leverages known power times (e.g., radio spin ups) for one or more cellular radios to preserve battery life on the mobile computing device 602. In other examples, however, aspects of the invention are operable to preserve, reduce consumption of, extend the life of, or optimize any resource on the first computing device 102.

In some embodiments, the mobile computing device 602 makes use of known scheduling data to identify a next scheduled radio time, make accommodations for network latency 214, and then publish this time to the interested application or server. In an example, the published time is slightly before the next scheduled radio time so that both the server communication and the device schedule leverages the same radio spin up. For example, the device schedule is to activate at 9 am, the published time is 8:59:45 am. The server communication then occurs at 8:59:45 am that raises the radio.

In embodiments in which a "fuzz" or tolerance factor is associated with each of the schedules 208, the tolerance factor affords a larger time window to target and coordinate a time for the second computing devices 104 to contact the first computing device 102. In an example with a ten-minute interval schedule having a tolerance factor of 50%, the second computing devices 104 may contact the first computing device 102 any time between time 5 and time 10 to leverage a radio spin up. The tolerance factor increases the probability that a radio spin up is leveraged.

Figure 3:
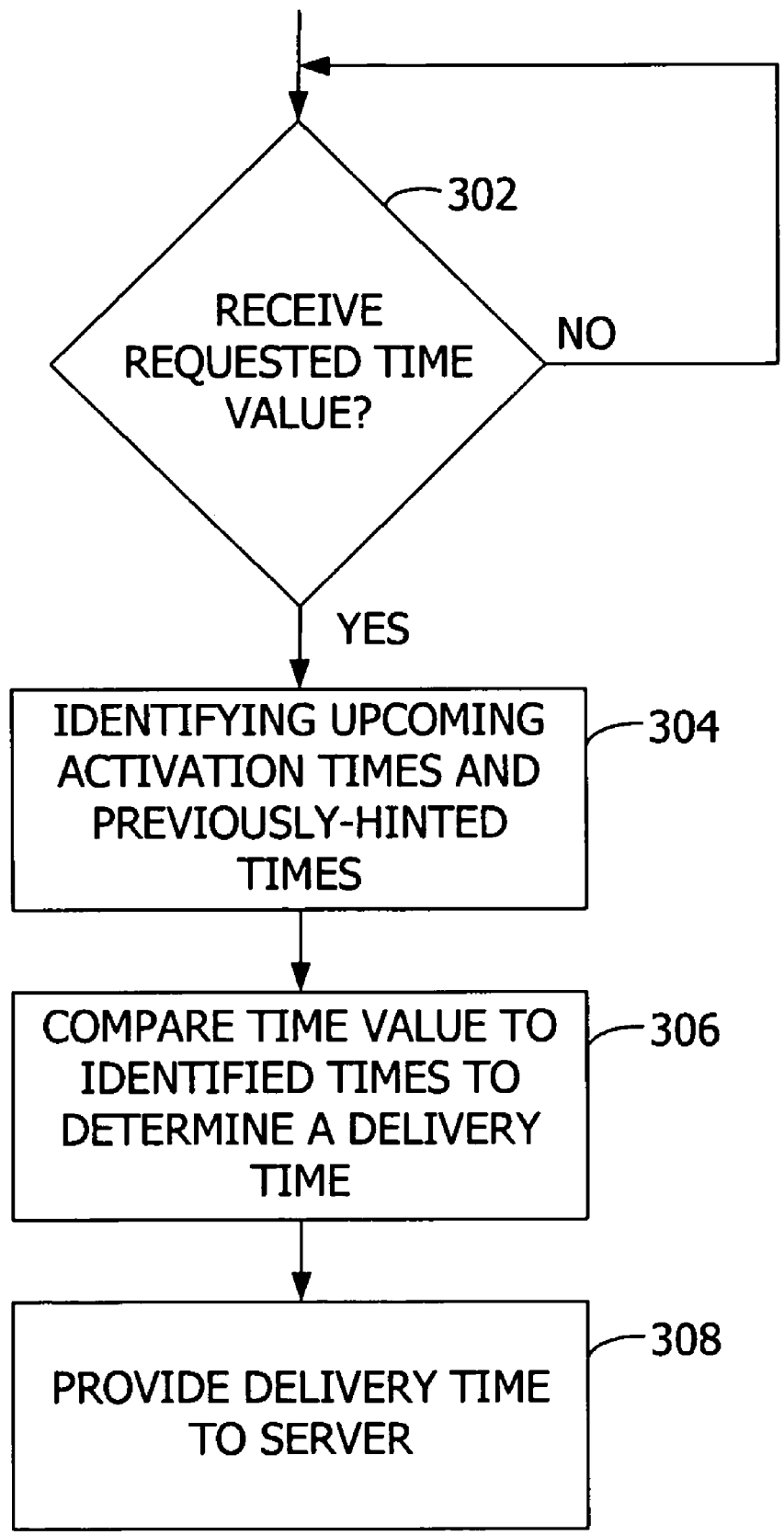
FIG. 3 is an exemplary flow chart illustrating a comparison of a requested time interval to activation times for recurrent schedules and previously suggested delivery times to determine a delivery time to suggest to a server.
Figure 4:
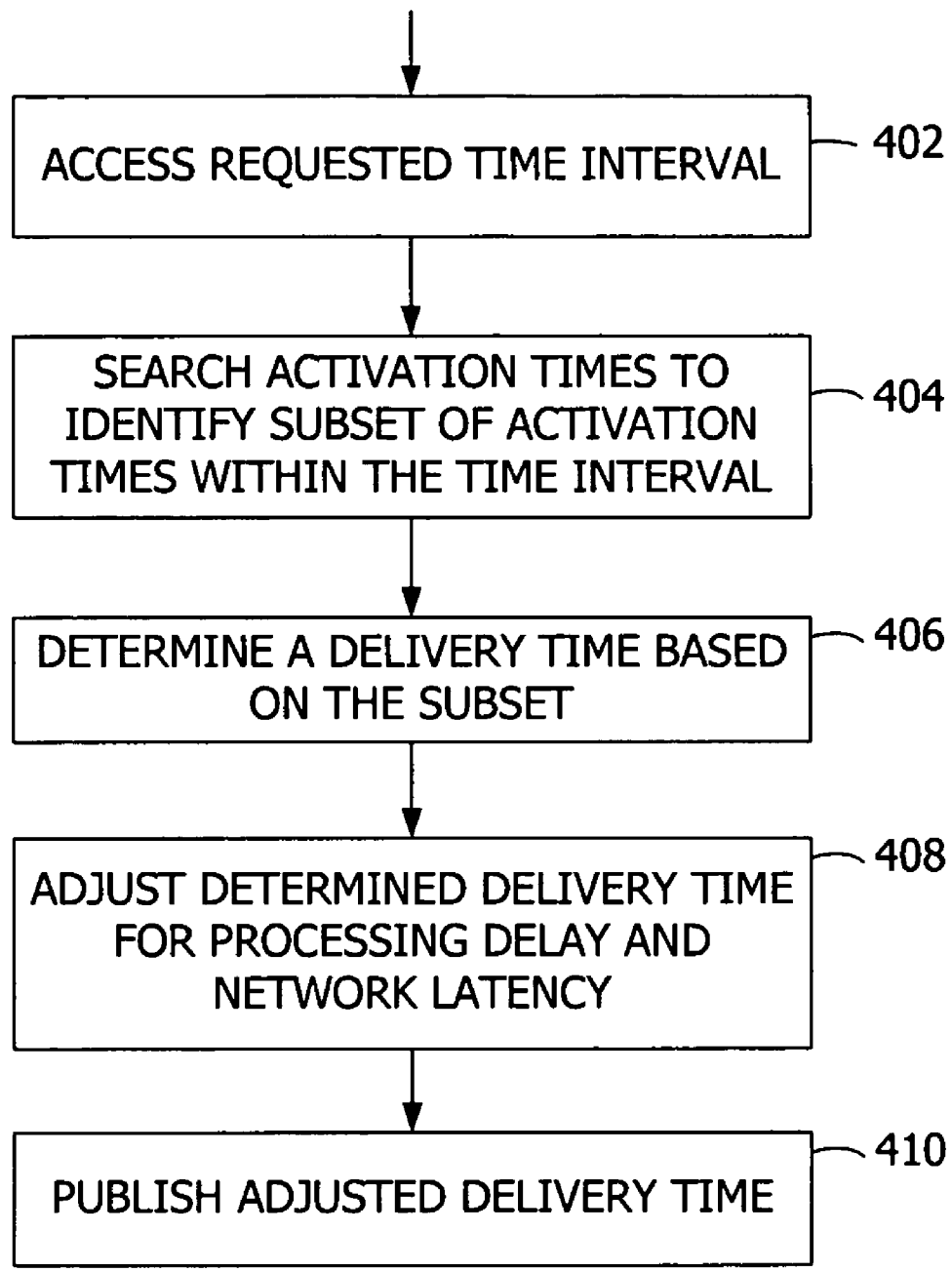
FIG. 4 is an exemplary flow chart illustrating determination of a data delivery time and adjustment of the determined delivery time based on processing delays and network latency.
Figure 5:
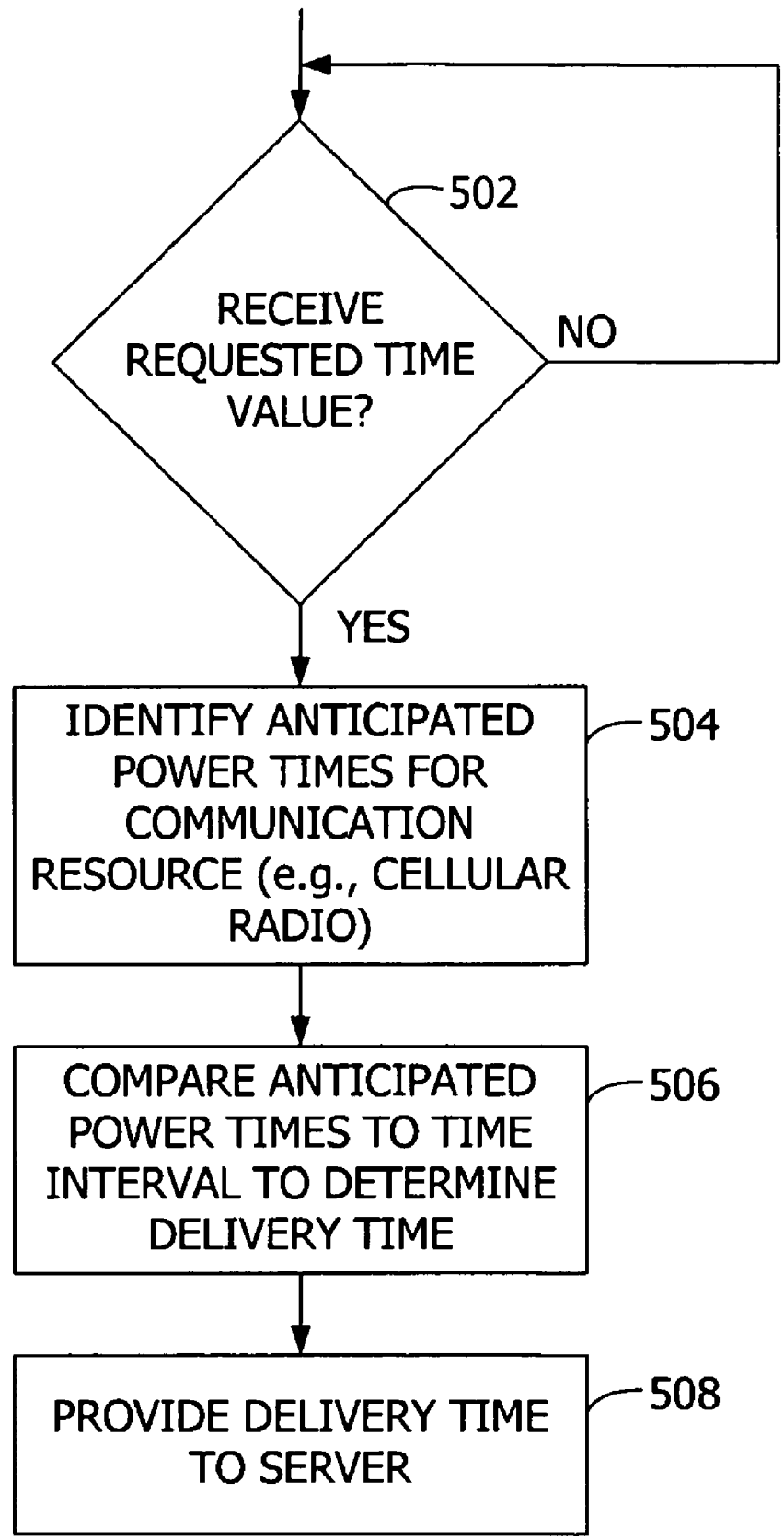
FIG. 5 is an exemplary flow chart illustrating determination of a data delivery time based on known power times for a communication resource associated with a mobile computing device.

Referring again to FIG. 1, an exemplary block diagram illustrates the first computing device 102 receiving data from a plurality of the second computing devices 104, such as second computing device #1 through second computing device #N, where N is a positive integer. The second computing devices 104 are connected to the first computing device 102 via a network 106 such as, for example, the Internet. In some embodiments, operations such as illustrated in FIG. 3, FIG. 4, and FIG. 5 are performed on the first computing device 102 by a scheduler 108, or other components, instructions, or logic.

The second computing devices 104 execute services to send data to the first computing device 102 periodically (e.g., regularly or intermittently). In some embodiments, the second computing devices 104 provide real-time content updates to the first computing device 102 (e.g., push mail, calendar, contacts, instant messaging, and social network data). The second computing devices 104 may also send or receive heartbeat pings to keep open the connection between the second computing devices 104 and the first computing device 102.

The second computing devices 104 include, but are not limited to, servers, proxy servers, enterprise servers, or any other device sending data to the first computing device 102. Further, while described in some embodiments with reference to the first computing device 102 including the mobile computing device 602, aspects of the invention are operable with other devices such as laptop computers, gaming consoles, hand-held navigation devices, or any other devices communicating with the second computing devices 104. Additionally, while embodiments of the invention are described with reference to a server sending data to the mobile computing device 602, aspects of the invention are operable in other environments such as peer-to-peer connections between the first computing device 102 and the second computing devices 104.

Figure 2:
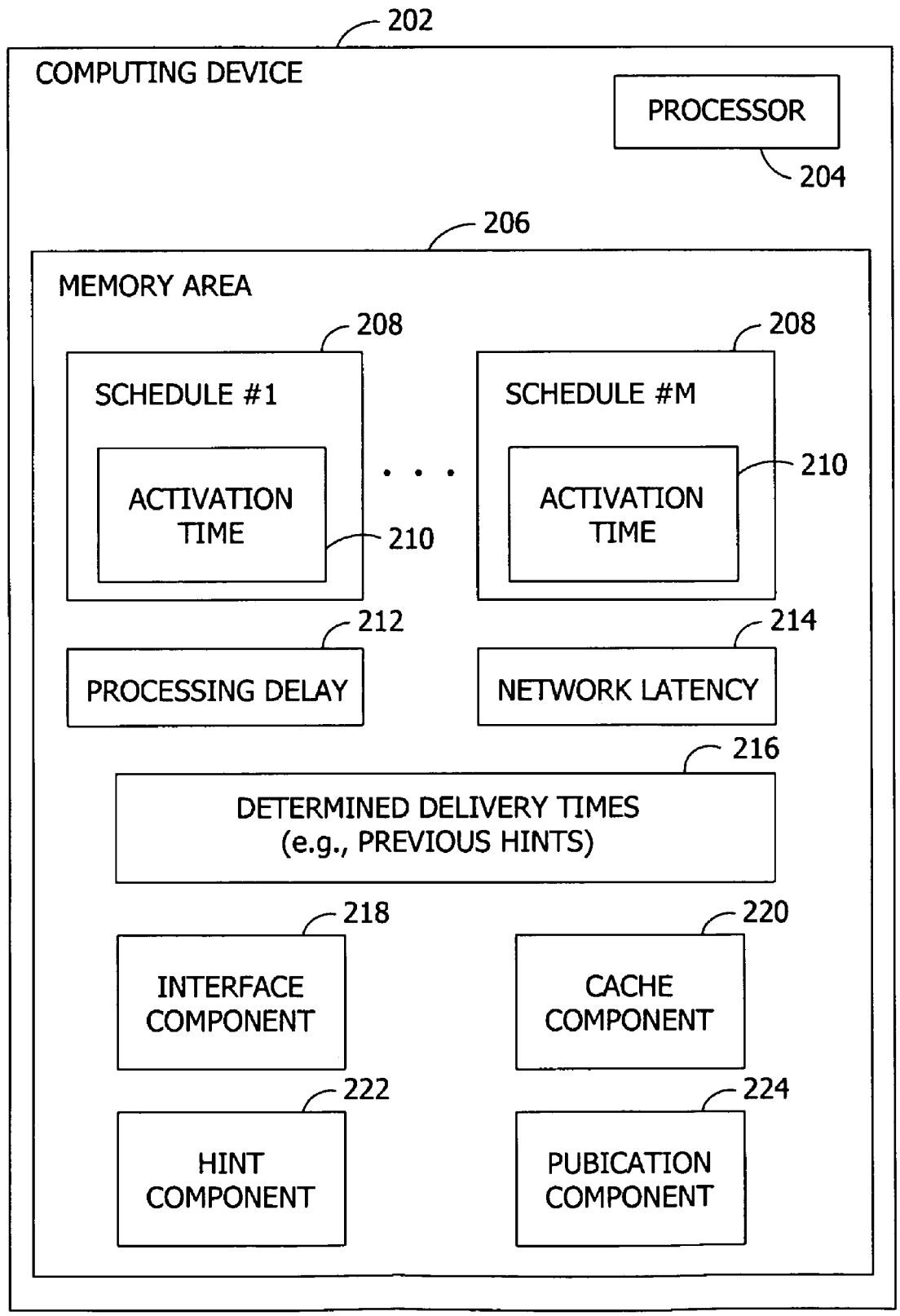
FIG. 2 is an exemplary block diagram illustrating a computing device storing known power times for a resource and computer-executable components for implementing aspects of the invention.

Referring next to FIG. 2, an exemplary block diagram illustrates a computing device 202 such as the first computing device 102 storing known power times for a resource and computer-executable components for implementing aspects of the invention. The computing device 202 includes a processor 204 and a memory area 206, or other computer-readable media. The memory area 206 stores a plurality of schedules 208 such as schedule #1 through schedule #M, where M is a positive integer. The schedules 208 are associated with and provided by the second computing devices 104 to transmit data to the computing device 202. Application programs execute the respective schedules 208 to send or receive data from devices such as the associated second computing devices 104, which causes a communication interface such as a cellular radio on the computing device 202 to power on. For example, the application programs are hosted by the computing device 202. Each of the schedules 208 has an activation time 210, and each schedule 208 is associated with at least one of the second computing devices 104. The schedules 208 have recurring activation times 210 in some embodiments.

Execution of the schedules 208 includes performing or executing one or more actions associated with the schedules 208 at the activation time 210. For example, the activation time 210 represents the time, as an absolute or an offset, at which the associated second computing devices 104 will send data to the computing device 202. The transmission of the data uses a power-consuming resource on the computing device 202 (e.g., a communication resource or radio resource such as one or more cellular radios). While the schedules 208 represent known future times during which the communication resource will be in use, the memory area 206 may alternatively or in addition explicitly store one or more known power times for the communication resource.

In some embodiments, the schedules 208 stored in the memory area 206 include conditional schedules 208, unconditional schedules 208, schedules 208 that consume the communication resource, and schedules 208 that do not consume the communication resource (or other resource to be optimized). In such embodiments, the computing device 202 filters, searches, or other generates a subset of the schedules 208 when determining delivery times. For example, unconditional schedules 208 have a greater chance of being executed (e.g., greatest likelihood of execution) than conditional schedules 208 and, as such, the activation times 210 associated with unconditional schedules 208 are given priority or preference over activation times 210 associated with conditional schedules 208 when determining a delivery time.

In other embodiments, the schedules 208 are pre-sorted, pre-filtered, or otherwise grouped. For example, the memory are may store separate groups of conditional, unconditional, resource-consuming, and non-resource consuming schedules 208 to speed determination of the delivery time.

The memory area 206 further stores a processing delay 212 and network latency 214. The processing delay 212 represents a delay due to processing on the computing device 202. The network latency 214 represents a delay due to network 106 transmission of data to the computing device 202. In some embodiments, either or both of the processing delay 212 and the network latency 214 are expressed as an offset. The processing delay 212 and network latency 214 are used by the computing device 202 to provide more accurate delivery times. In some embodiments, the processing delay 212 and the network latency 214 are determined by the computing device 202 (e.g., measure time differences during processing or network transmissions). In other embodiments, the network latency 214 is provided to the computing device 202 (e.g., by the device sending data to the computing device 202).

The memory area 206 further stores one or more previously determined delivery times 216. The previously determined delivery times 216 represent hinted or suggested times for delivering data to the computing device 202. The previously determined delivery times 216 represent times to occur in the future. In an example in which a current time is 12:30 pm, the computing device 202 determines and provides a delivery time of 12:40 pm to a first application program. Upon receipt of a request for a delivery time from a second application program, the computing device 202 is aware of the previously determined delivery time of 12:40 pm and able to consider providing this time to the second computing device 104 to coordinate use of the communication resource on the computing device 202, as described in more detail below with reference to FIG. 3.

The memory area 206 further stores one or more computer-executable components such as an interface component 218, a cache component 220, a hint component 222, and a publication component 224. Operation of these components is described with reference to FIG. 5 below.

Referring next to FIG. 3, an exemplary flow chart illustrates a comparison of a requested time interval to activation times 210 for the schedules 208 and previously suggested delivery times 216 to determine a delivery time to suggest to a server. At 302, a computing device such as the first computing device 102 receives a requested time value from another computing device, such as the server or the second computing device 104. The time value includes, in some embodiments, a time interval or range specifying a minimum time value and a maximum time value. The time value may be an absolute time or an offset from a current time (e.g., a time of receipt by the first computing device 102). An example means for specifying the time interval is shown in Appendix A.

Upon receipt of the requested time value, the first computing device 102 identifies one or more upcoming activation times 210 associated with the schedules 208 at 304. For example, the first computing device 102 identifies activation times 210 associated with schedules 208 that consume the communication resource (or other resource to be optimized). The first computing device 102 then identifies those activation times 210 that are associated with unconditional schedules 208. If no such schedules 208 are available, the first computing device 102 identifies those activation times 210 associated with conditional schedules 208.

The first computing device 102, also at 304, identifies one or more previously determined delivery times 216. For example, the first computing device 102 accesses the previously determined delivery times 216 stored in the memory area 206. At 306, the requested time value is compared to the identified activation times 210 and to the previously determined delivery times 216. Based on the comparison, the first computing device 102 determines a delivery time, also at 306. In an example in which the requested time value is an interval, the determined delivery time represents a time within the interval. Alternatively or in addition, the determined delivery time represents a time corresponding to one of the upcoming activation times 210 or to one of the previously determined delivery times 216. In such embodiments, usage of the communication resource is optimized because multiple servers will use the communication resource while the communication resource is powered on.

At 308, the determined delivery time is provided to the server. The server sends data to the first computing device 102 at the provided delivery time. In some embodiments, the requested time value is received from an application program executing on the first computing device 102, yet associated with the server. In such embodiments, the determined delivery time is provided to the application program. The application program conveys the determined delivery time to the server, and the server sends the data to the first computing device 102 at the determined delivery time.

In an embodiment in which a plurality of servers intends to send data to the first computing device 102, each of the servers has a priority associated therewith. The first computing device 102 uses the assigned priority when determining delivery times. For example, if the communication resource is available for a particular time interval, servers with a high priority requesting a delivery time will receive a determined delivery time earlier in the particular time interval. Servers with a lower priority will receive a determined delivery time later within the particular time interval.

Referring next to FIG. 4, an exemplary flow chart illustrates determination of a data delivery time and adjustment of the determined delivery time based on processing delays 212 and network latency 214. At 402, a time interval requested by the server or other second computing device 104 is accessed (e.g., by the first computing device 102). The requested time interval represents a range of time during which the server desires to send data to the first computing device 102. At 404, the activation times 210 (and the previously determined delivery times 216, in some embodiments) are searched to identify a subset of the activation times 210 that are within the requested time interval. At 406, the delivery time is determined based on the identified subset of the activation times 210 to coordinate consumption of the communication resource. At 408, the determined delivery time is adjusted based on an offset corresponding to the processing delay 212 and/or the network latency 214. At 410, the determined delivery time is published to the server.

Exemplary instructions or operations for determining the delivery time are described in Appendix B.

Referring next to FIG. 5, an exemplary flow chart illustrates determination of a data delivery time based on known power times for the communication resource associated with the mobile computing device 602. In the example of FIG. 5, the interface component 218, cache component 220, hint component 222, or publication component 224 execute on the mobile computing device 602. At 502, the interface component 218 receives or accesses a requested time interval or value. The time interval is associated with an expected transmission of data from the server to the mobile computing device 602. At 504, the cache component 220 identifies one or more anticipated power times for the communication resource on the mobile computing device 602. The anticipated power times represent, for example, upcoming activation times 210 for schedules 208 executing on the mobile computing device 602 that consume the communication resource or previously determined delivery times 216.

At 506, the hint component 222 determines a delivery time based on a comparison of the requested time interval received by the interface component 218 and the anticipated power times identified by the cache component 220. For example, the hint component 222 sets the delivery time to the beginning of a time interval corresponding to one of the anticipated power times. In some embodiments, the request received by the interface component 218 includes a payload value representing an expected size of the data transmission. In such embodiments, the hint component 222 determines the delivery time based on the received payload value to manage bandwidth on the mobile computing device 602 (e.g., to avoid thrashing the communication resource). For example, data packets with small payloads are prioritized to be sent first, followed by data packets with large payloads. Alternatively or in addition to payload size, payloads traversing some of the interfaces are given a priority and send in descending priority order.

At 508, the publication component 224 provides the delivery time determined by the hint component 222 to the server. The server sends the data to the mobile computing device 602 at the provided delivery time.

In some embodiments, the mobile computing device 602 has a plurality of cellular radios. In such embodiments, the request received by the interface component 218 includes an identification of one of the cellular radios. In other embodiments, the mobile computing device 602 assigns the request to one of the cellular radios. In still other embodiments, the radio used by each of the schedules 208 that has persisted connections is tracked. The identified cellular radio becomes another variable used by the hint component 222 to determine the delivery time. In such embodiments, each of the previously determined delivery times 216 stored in the memory area 206 includes the identification the associated cellular radio. The hint component 222 prioritizes schedules 208 with the same identified cellular radio when determining a delivery time.

Figure 6:
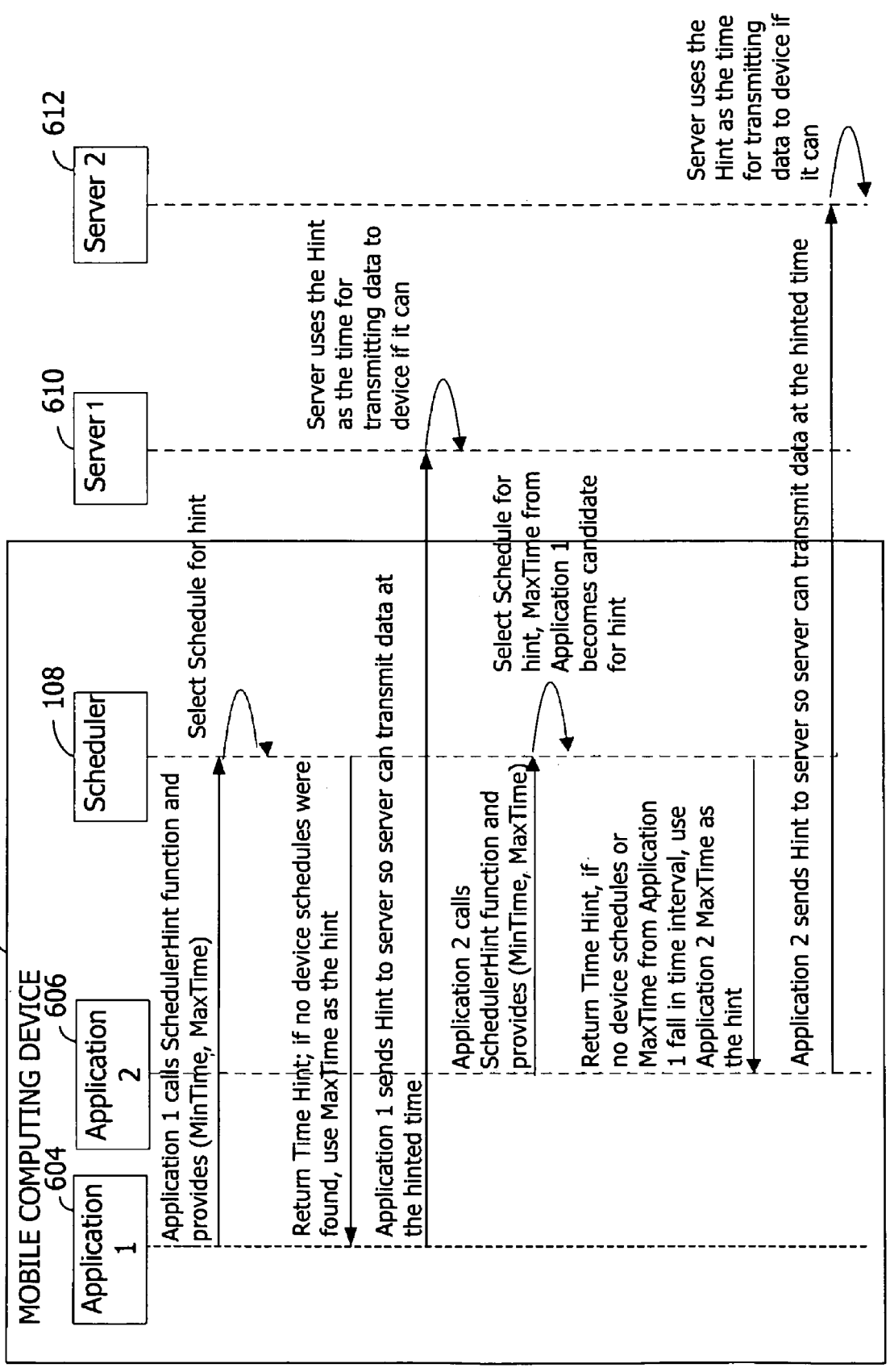
FIG. 6 is an exemplary sequence diagram illustrating the scheduling of data delivery to a mobile computing device from two servers.

Referring next to FIG. 6, an exemplary sequence diagram illustrates the scheduling of data delivery to the mobile computing device 602 from two servers. Two application programs 604, 606 executing on the mobile device request hints for data delivery to the mobile computing device 602. Upon receipt of the hints from the scheduler 108, the application programs 604, 606 provide the hints to the associated servers 610, 612. The servers 610, 612 then attempt to send the data to the mobile computing device 602 at the hinted times.

In the example of FIG. 6, the list of known power times (e.g., upcoming activation times 210 or previously determined delivery times 216) is referred to as a list of ServerSendTimes. The list of ServerSendTimes is created during startup of the scheduler 108 or other service and is cleared when the scheduler 108 ends processing. The list of ServerSendTimes is treated as a cache so that if a cache entry falls between the requested time interval, the cache entry is considered as a candidate when determining another delivery time. In some embodiments, the cache is represented as a hash map with <key, value>=<ServerSendTime, frequency>. A map of <ServerSendTime, frequency> is sorted on key(ServerSendTime). In such an example, the map speeds identification of the ServerSendTime nearest to the end time.

In some embodiments, the activation times 210 for each of the schedules 208 are stored as a cache sorted by activation time 210 (e.g., ascending order). The caches stores the activation times 210 for all active schedules 208. The cache is created or updated with each received request from the server to delivery data. In some embodiments, the scheduler 108 simply provides or publishes this cache to enable the server to select an appropriate delivery time.

In the example of FIG. 6, upon receipt of a requested time interval, the scheduler 108 iterates through the cache and deletes all the entries that have expired (e.g., having an activation time 210 less than a current time). The scheduler 108 iterates through the schedules 208 to identify a subset of active, recurring schedules 208 that use the communication resource on the mobile computing device 602. The next activation time 210 for each of the schedules 208 in the subset of schedules 208 is calculated. From this subset of schedules 208, the scheduler 108 identifies activation times 210 that fall within the time interval requested by the server. The scheduler 108 gives a preference to activation times 210 associated with schedules 208 that have a high certainty of execution. For example, schedules 208 with no conditions for execution have a high certainty of execution. The scheduler 108 updates the cache of activation times 210 based on the identified subset of schedules 208.

The scheduler 108 determines a delivery time or other hint time based on the cache of activation times 210 and the list of ServerSendTimes. If one of the activation times 210 falls within the requested time interval, that activation time 210 is added to the list of ServerSendTimes, and the frequency is set to one. If there is no satisfying activation time 210 in the cache of activation times 210, the scheduler 108 scans the list of ServerSendTimes. If one of the ServerSendTimes falls within the requested time interval, that ServerSendTime is provided to the requesting server and the frequency of that ServerSendTime is incremented in the list. If more than one ServerSendTime falls within the interval, the ServerSendTime with the highest frequency is selected. If none of the ServerSendTimes fall within the requested time interval, the closest ServerSendTime is selected (e.g., based on a defined tolerance or delta region). The delivery time is set to the beginning of the closest ServerSendTime. If no ServerSendTime falls within the time interval, the end time of the requested time interval is set to be the ServerSendTime. The end time is then entered into the list of ServerSendTimes with a frequency of one (1).

While the example of FIG. 6 illustrated an exemplary delivery time determination, other selection methods are within the scope of aspects of the invention. Further, the selection methods may be changed dynamically.

In some embodiments, the minimum time value is the current time and the maximum time value represents the maximum heartbeat interval (e.g., the longest period of time the mobile computing device 602 and the server can go without transmitting data and still persist the connection).

In an embodiment (not shown), the server is a proxy server staging data from one or more of the servers. The proxy server stages the data before sending the data to the mobile computing device 602. The proxy server has a priority assigned to data packets (or to the servers). The priority represents the urgency to get the data packet to the mobile computing device 602 (e.g., versus the tolerance to delay the packet). The proxy server quantifies the priority in terms of willingness (e.g., in minutes) to wait before sending the data. On the mobile computing device 602, the application provides the minimum time (e.g., current time) and the maximum time equal to the duration that the server originating the data packet is willing to delay delivery of the data. When the mobile computing device 602 application sends a heartbeat ping to the server, it includes the determined delivery time or hint for the most optimal future time for the server to transmit data.

The ServerSendTime represents a start time for the servers to send data. In embodiments in which the resource is known to be available for some duration after the ServerSendTime (e.g., a cellular radio tail), the duration is considered by the scheduler 108. For example, the tolerance or delta region is set based on the known cellular radio tail.

EXAMPLES

In an example, a mail server asks for a hint and provides 12:00 and 12:20 as the minimum and maximum times. The scheduler 108 has an active schedule with an active connection at 12:20 with a 10-minute interval duration schedule. The scheduler 108 identifies the active schedule, adjusts the delivery time to account for network latency 214 and/or processing delay 212 (e.g., thirty seconds), determines a delivery time of 12:19:30, and provides the determined delivery time to the server.

In a variation of the example immediately above, no activation times 210 fall within the requested time interval. In this example, the scheduler 108 sets the maximum time of 12:20 as the determined delivery time (e.g., ServerSendTime).

In a continuation of the example immediately above, another server provides 12:15 and 12:30 as the minimum and maximum times. The ServerSendTime is equal to 12:20, which falls within the requested time interval. After adjusting for network latency 214, the scheduler 108 provides 12:19:30 as the determined delivery time.

Exemplary Operating Environment

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The embodiments illustrated and described herein as well as embodiments not specifically described herein but within the scope of aspects of the invention constitute exemplary means for determining the delivery time based on known power times for the radio resource within the requested time interval, and exemplary means for adjusting the delivery time based on the processing delay 212 and the latency.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Appendix A

The application programming interface (API) shown below enables an application program to provide a minimum time and a maximum time interval. A scheduler executing on the first computing device returns a hint (in universal time code format, for example) that falls between the two intervals. The API signature is shown below.

```
// preconditions:-
//     startTime <= endTime
//     CurrentTime <= endTime
// postconditions:-
//     startTime <= serverSendTime and serverSendTime <= endTime
HRESULT TaskSchedulerGetBestNetworkTimeInRange(_in const FILETIME *
startTime, _in const FILETIME *endTime, _out FILETIME
*serverSendTime);
```

This API gets a hint time for the server to send the data to the device between startTime and endTime.
Parameters
startTime
[in] the start time of the interval.
endTime
[in] the end time of interval.
serverSendTime
[out] the hint time at which the server needs to send data to device.
Return Values
S_OK
Value returned if successful.
$E_{13}$ INVALIDARG
Value returned if any of preconditions fails or for invalid arguments.
E_FAIL
Value returned if unsuccessful An exemplary API to cancel a hint previously returned by TaskSchedulerGetBestNetworkTimeInRange ( ) is shown below. This API is used by any requestor who ends up not using a hint. This API increases the accuracy effectiveness of aspects of the invention at least because hinted times are weighted higher when published. With this API function call, the scheduler closely tracks the usage of hint time values and improves the heuristics used internally by the scheduler when handing out hint times subsequently. In the example below, the caller (account) using TaskSchedulerCancelBestNetworkTime to cancel an existing hint is the same caller (account) that used TaskSchedulerGetBestNetworkTimeInRange to get the hint.
HRESULT TaskSchedulerCancelBestNetworkTime(_in const FILETIME *serverSendTime);
Parameters
serverSendTime
[in] the hint time previously returned by TaskSchedulerGetBestNetworkTimeInRange.
Return Values
S_OK
The release of the hint time has been tracked.
S_FALSE
The hint time is not recognized (either the value has "expired" or is not previously returned by TaskSchedulerGetBestNetworkTimeInRange).
E_*
Other failures encountered while processing the request.

Appendix B

Exemplary instructions or operations for determining the delivery time are shown below.

A list of ServerSendTime is created during service startup and cleared when service is stopped. This list is treated as a cache so that if a cache entry falls between intervals, the cache entry may be considered as a candidate for ServerSendTime without having to oterate through all the schedules and calculate the ServerSendTime again. The cache may be represented internally as a hashmap with <key, value>=<ServerSendTime, mapAcctIdtoFreq> where mapAcctIdtoFreq is a hash map of owner account id to frequency and may be defined as:
map<ACCTID,DWORD> mapAcctIdtoFreq;
A map of <ServerSendTime map AcctIdtoFreq> is sorted on key (ServerSendTime).
A list of <NRT> sorted on NRT(nextruntime) is also maintained. This list is created every time the API is calle. The list stores the NRT of all active schedules.
An exemplary algorithm for determining the delivery time is next described.
1. Iterate through the cache and delete all the entries that have expired (e.g., whose NRT <CurrentTime).
2. If starttime==endTime then add the value to cache <ServerSendTime, mapAcctIdtoFreq> if not present, otherwise add/increment the frequency in mapAcctIdtoFreq if ServerSendTime already present in cache.

3. If ShrinkFactor is defined in registry then reduce the (starttime-endTime) interval based on the shrink factor. Starttime is pushed to newStartTime and interval becomes (newStartTime-endTime).
   If not defined newStartTime=starttime.
   This is done to make the hinttime always near to end time.
4. Iterate through the group collection.
5. Iterate through all schedules in each group.
6. Consider only the schedule that satisfies the following conditions.
   a) Recurrence !=BOOTUP
   b) Network Connectivity=TRUE (Schedules with no network connectivity are not considered for SendServerTime as they may or may not be able to help in reducing radio spins)
   c) If IsCellularPreferred=1, then only consider schedules with CELLULAR=ON. Do not consider the CELLULAR condition if IsCellularPreferred=0.
   d) Active=True. The considered schedules includes schedules that are currently active and will stay active in future given the newStartTime-endtime and MaxRuncounts conditions satisfied.
7. The ServerSendTime is created from the list created in step 6 as next described.
   For each schedule selected in list (e.g., created in step 6), calculate the Nth RunTime. The Nth runtime is calculated using formula
   For Recurrence Average
   NRT(N)=NRT(N-1)+CurrentIntervalDuration
   For Recurrence Interval
   NRT(N)=NRT(N-1)+CurrentIntervalDuration
   Where NRT(0)=Group active schedule next run time
   Consider only the schedules that belong to following two categories.
   a) Schedule with no condition and is the only schedule in group
   b) Schedule with no conditions and all other schedules in group also have no conditions.
   If there is at least one schedule in group with some conditions, that group is not considered for ServerSendTime.
8. This results in a list <NRT> and a cache of <ServerSendTimes, mapAcctIdtoFreq>. Next, the "best" hint time in interval <newStartTime,endTime> is selected.
   Based on registry setting IsPreferredCache at least two permutations are possible.
   a) If IsPreferredCache=1 then first look for ServerSendTime in cache <ServerSendTimes, mapAcctIdtoFreq>.
      If only one ServerSendTime found then goto step 10.
      If multiple values of ServerSendTime found then look for serverSendTime with maximum frequency and goto step 10.
      If multiple values of ServerSendTime found with two or more ServerSendTime with same maximum values then select the one based on UseEndtime registry value.
      If UseEndTime=1
         Select value near to end interval
      If UseEndTime=1
         Select value near to start interval
      Else if not found in cache, look into list<Nrt>
      If IsPreferredCache=2 then first look for ServerSendTime in list<NRT>. If ServerSendTime found the goto step 10.
      If multiple NRTS found then select the one based on UseEndTime registry value
      If UseEndTime=1
         Select value near to end interval
      If UseEndTime=1
         Select value near to start interval
      Else if not found in list<NRT> then look into cache<ServerSendTime,mapAcctIdToFreq>
9. If ServerSendTime is not found from step 8 then
   If ShrinkFactor=0
      Compute the delta region and look for ServerSendTime in delta region from cache<ServerSendTime, mapAcctIdtoFreq>. Delta region may be considered as
      Starttime-delta to Starttime
      If no ServerSendTime found in delta region also, then based on UsedEndTime registry value assign ServerSendTime
         If UseEndTime=1
            ServerSendTime=Endtime
         If UseEndTime=0
            ServerSendTime=StartTime
   If ShrinkFactor=1
      Delta region cannot be checked in this case as starttime is already pushed to new value.
      Assign ServerSendTime to EndTime.
      ServerSendTime=EndTime
10 IF ServerSendTime if found from step 8 then
   a. Adjust the ServerSendTime with NetworkLatencyAdjustment
      ServerSendTime=ServerSendTime-NetworkLatencyAdjustment
      Check if new ServerSendTime=StartTime.(StartTime without applying ShrinkFactor)
      If not then assign ServersendTime=StartTime.(StartTime without applying ShrinkFactor)
11. Now ServerSendTime is computed, look for this ServerSendTime value in cache<ServerSendTimes, mapAcctIdtoFreq>.
    a. If not found in cache then add this value with owner account id and frequency=1
    b. If found in cache then look for acct id. If account id also exists then increment the frequency. If account Id does not exist then add the account id with frequency=1.
12. If TaskSchedulerCancelBestNetworkTime is called with some time value, it will search that value in cache<ServerSendTimes, mapAcctIdtoFreq>. If the value is found in cache then corresponding mapAcctIdtoFreq is searched for owner account id. If some value is found in mapAcctIdtoFreq then frequency is decremented.
    When frequency=0, remove the entry from mapAccttoFreq.
    Also if mapAccttoFreq is empty, remove the ServerSendTime value from cache<ServerSendTimes, mapAcctIdtoFreq>.
Note:
1) NetworkLatencyAdjustment is the value determined using network latency and processing delay. This is a configurable registry entry that accounts for network latency. Every time the ServerSendTime is returned, it should be offset by NetworkLatencyAdjustment
2) If the absolute time of device changes, the time values in the cache <ServerSendTime,frequency> need to be adjusted based on the time change.

This may be done by registering with notifications of timechange events.

3) There can be scenarios when API is called with start/end time too fine in future (e.g., the interval is 10 years later). In such case, a boundary check is performed in the API (e.g., interval is within 24 hours from current time) instead of calculating NRT<N>.

4) Registry values including StarttimePreferred/Endtime-Preferred and FrequencyPreferred are configurable registry entries. Based on these registry values, the selection algorithm may be changed dynamically.

What is claimed is:

1. A system for suggesting a time for sending data from a server to a mobile computing device via a network, said system comprising:
   a memory area for storing a plurality of activation times, said activation times being associated with a plurality of schedules, wherein activation of the plurality of schedules consumes a radio resource on the mobile computing device, said memory area further storing an offset representing a processing delay on the mobile computing device and a latency associated with the network; and
   a processor programmed to:
      access a time interval requested by the server for sending data to the mobile computing device;
      search the stored plurality of activation times based on the requested time interval to identify a subset of the plurality of activation times;
      determine a delivery time based on the identified subset of the plurality of activation times;
      adjust the determined delivery time based on the offset stored in the memory area; and
      publish the adjusted delivery time, wherein the server sends the data to the mobile computing device based on the published adjusted delivery time.

2. The system of claim 1, wherein the determined delivery time comprises an offset from a current time.

3. The system of claim 1, wherein the processor is further programmed to receive the time interval from a server-associated application program executing on the mobile computing device.

4. The system of claim 1, wherein the server sends the data to the mobile computing device at the published activation time.

5. The system of claim 1, wherein the processor is further programmed to select the one of the subset by identifying the schedule having a greatest likelihood of execution.

6. The system of claim 1, wherein the mobile computing device comprises a plurality of radios, wherein the processor is programmed to receive a request from the server for the time interval, said request identifying one of the radios, and wherein the processor is programmed to search the stored plurality of activation times based on the requested time interval and the identified radio.

7. The system of claim 1, further comprising:
   means for determining the delivery time based on known power times for the radio resource within the requested time interval; and
   means for adjusting the delivery time based on the processing delay and the latency.

8. A method comprising:
   receiving, by a first computing device via a network, a requested time value from a second computing device;
   identifying a plurality of activation times associated with a plurality of schedules, wherein activation of the plurality of schedules consumes a resource on the first computing device,
   identifying one or more previously determined delivery times;
   comparing the requested time value to the identified plurality of activation times and to the identified previously determined delivery times to identify a subset of the identified plurality of activation times and a subset of the identified previously determined delivery times;
   determining a delivery time based on the identified subset of the identified plurality of activation times and the identified subset of the identified previously determined delivery times;
   adjusting the determined delivery time based on an offset representing a processing delay on the first computing device and a latency associated with the network; and
   providing the adjusted delivery time to the second computing device, wherein the second computing device sends data to the first computing device at the provided adjusted delivery time.

9. The method of claim 8, wherein receiving the requested time value comprises receiving a minimum time value and a maximum time value.

10. The method of claim 8, wherein receiving the requested time value comprises receiving the requested time value from an application program associated with the second computing device, said first computing device hosting execution of the application program, and further comprising providing the determined delivery time to the application program for communication to second computing device.

11. The method of claim 8, wherein the second computing device is one of a plurality of computing devices, wherein each of the plurality of computing devices has a priority associated therewith, and wherein determining the delivery time comprises determining the delivery time based on the priority associated with the second computing device.

12. The method of claim 8, wherein identifying the plurality of activation times comprises identifying a plurality of activation times associated with unconditional schedules.

13. The method of claim 8, wherein the time value comprises a time interval, and wherein determining the delivery time comprises determining a delivery time within the time interval and corresponding to one of the previously determined delivery times.

14. The method of claim 8, wherein the time value comprises a time interval, and wherein determining the delivery time comprises determining a delivery time within the time interval and corresponding to one of the plurality of activation times.

15. The method of claim 8, wherein the time value comprises a time interval, and wherein determining the delivery time comprises determining a delivery time within the time interval, wherein the determined delivery time is slightly earlier than one of the plurality of activation times.

16. The method of claim 8, further comprising determining the processing delay associated with the first computing device.

17. One or more computer-readable storage media having computer-executable components for managing data delivery to a first computing device, said components comprising:
   an interface component for receiving a requested time interval, said requested time interval associated with an expected transmission of data from a second computing device to the first computing device via a network;
   a cache component for identifying a plurality of anticipated activation times associated with a communication resource on the first computing device,
   a hint component for determining a delivery time based on a subset of the plurality of anticipated activation times, said subset being generated from a comparison of the time interval received by the interface component and the plurality of anticipated activation times identified by the cache component, said determined delivery time being adjusted based on an offset representing a processing delay on the first computing device and a latency associated with the network; and a publication component for providing the adjusted delivery time determined by the hint component to the second computing device, wherein the second computing device sends the data to the first computing device at the provided adjusted delivery time.

18. The computer-readable storage media of claim 17, wherein the interface component, cache component, hint component, and publication component execute on the first computing device.

19. The computer-readable storage media of claim 17, wherein the communication resource comprises a cellular radio, and wherein the hint component determines the delivery time by setting the delivery time to a beginning of one of the anticipated activation times of the cellular radio within the requested time interval.

20. The computer-readable storage media of claim 17, wherein the interface component further receives a payload value representing an expected size of the expected transmission of data, and wherein the hint component determines the delivery time based on the received payload value to manage bandwidth on the first computing device.

* * * * *

UNITED STATES PATENT AND TRADEMARK OFFICE
CERTIFICATE OF CORRECTION

| | | |
|---|---|---|
| PATENT NO. | : 7,966,410 B2 | |
| APPLICATION NO. | : 12/237797 | |
| DATED | : June 21, 2011 | |
| INVENTOR(S) | : Anh P. Tran et al. | |

It is certified that error appears in the above-identified patent and that said Letters Patent is hereby corrected as shown below:

In column 10, line 14, after "accuracy" insert -- and --.

In column 11, line 43, after "list" insert -- of --.

In column 11, line 65, delete "If" insert -- b) If --.

Signed and Sealed this
Twenty-third Day of August, 2011

David J. Kappos
*Director of the United States Patent and Trademark Office*